Figure 1:
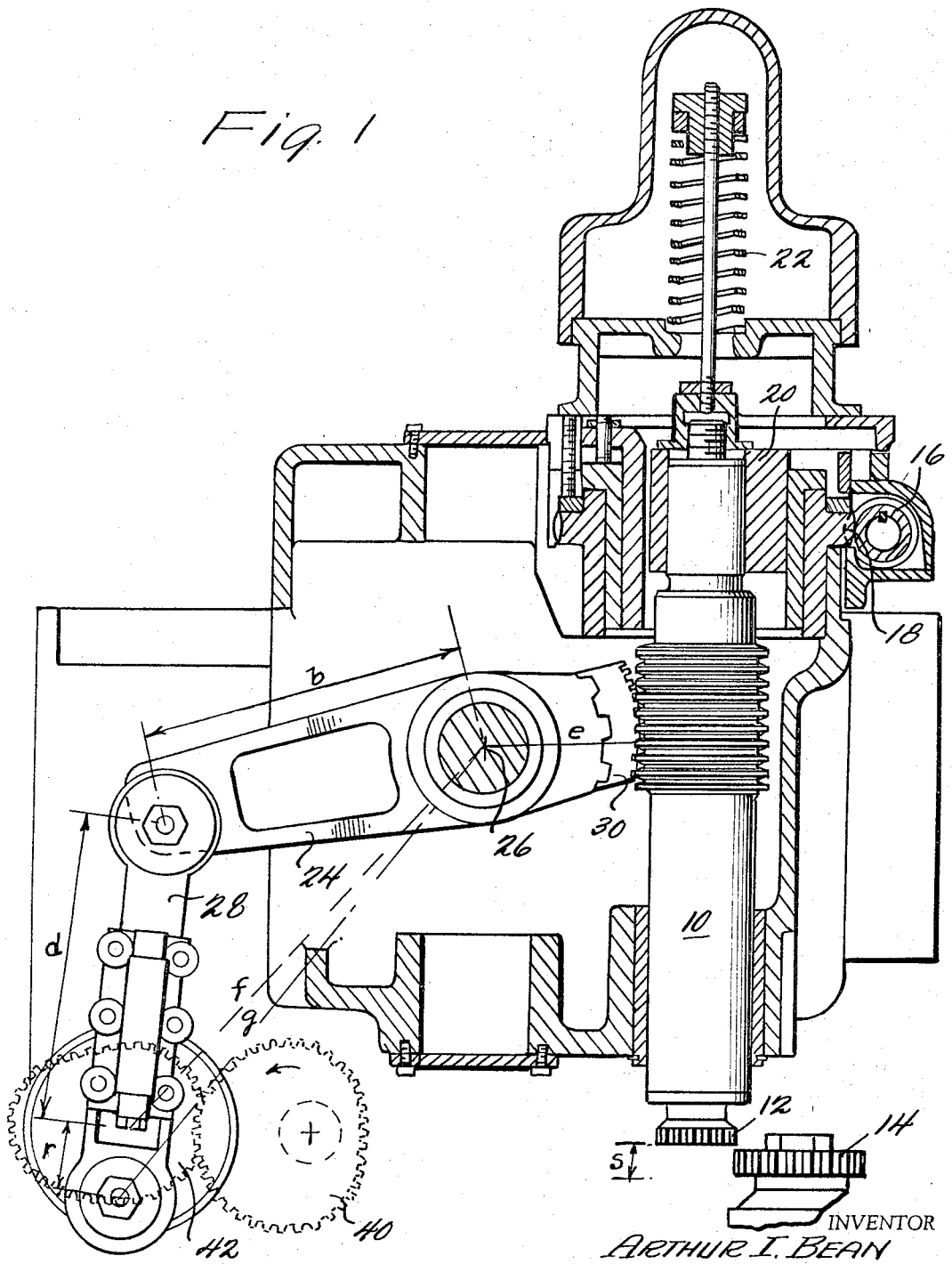

May 14, 1968     A. I. BEAN     3,382,767
GEAR SHAPER DRIVING MEANS
Filed April 19, 1966     3 Sheets-Sheet 1

INVENTOR
ARTHUR I. BEAN

BY Cushman, Darby & Cushman
ATTORNEYS

May 14, 1968     A. I. BEAN     3,382,767
GEAR SHAPER DRIVING MEANS

Filed April 19, 1966     3 Sheets-Sheet 2

INVENTOR
ARTHUR I. BEAN

BY
ATTORNEYS

May 14, 1968  A. I. BEAN  3,382,767
GEAR SHAPER DRIVING MEANS
Filed April 19, 1966   3 Sheets-Sheet 3

INVENTOR
ARTHUR I. BEAN

BY
Cushman, Darby & Cushman
ATTORNEYS

United States Patent Office 3,382,767
Patented May 14, 1968

3,382,767
GEAR SHAPER DRIVING MEANS
Arthur I. Bean, Springfield, Vt., assignor to The Fellows Gear Shaper Company, Springfield, Vt., a corporation of Vermont
Filed Apr. 19, 1966, Ser. No. 543,727
5 Claims. (Cl. 90—7)

This invention relates to an improved gear shaper apparatus, and in particular the invention provides for a gear shaper having a quick return drive for a cutter spindle carrying the gear cutting tool.

Gear shaper devices are well known in the art, as exemplified by the Miller Patent 2,034,765, Mar. 24, 1936, owned by the assignee of this invention. Such gear shaper devices have provided for a reciprocating and rotating spindle means which carries a gear cutter into and out of engagement with a workpiece. The gear cutter is shaped to generate gear teeth in the workpiece, and the cutting action takes place while the spindle is being moved downwardly so as to place the cutter in engagement with the workpiece. Upon completion of each downward movement of the spindle and cutter, it is necessary to reciprocate the spindle upwardly to begin a new cutting stroke. It is the return stroke of the reciprocation with which this invention is primarily concerned, however, an improvement is also made in the cutting stroke for the device of this invention.

The present invention has found that the cutting stroke speed of a gear cutter can be made more uniform and the return stroke can be made more rapid relative to the cutting stroke by the provision of novel driving gear configurations for reciprocating a spindle and cutter of the type shown in the Miller patent. The improved configuration of gears is combined with a particular cranking arrangement for actuating a gear cutter spindle in vertical reciprocal motions. In prior devices, circular gears have driven a cranking means for effecting the reciprocation of the gear cutter, and the resulting reciprocal movements have had certain disadvantages in their non-uniform velocity, and in the inability to speed up a gear cutting operation by effecting a more rapid return of the gear cutter to an initial position for the beginning of each cutting stroke.

The reciprocal driving means of this invention includes non-circular gears used in conjunction with a crank mechanism to drive the gear cutter spindle. The non-circular gear drive and its particular relationship to the crank results in a more uniform cutting speed of the gear cutter during its downward cutting stroke. Further, the arrangement and relationship of the gears to the crank mechanism results in a rapid return of the gear cutter in an upward stroke which places the cutter in an initial position to beginning a new cutting stroke. This rapid return feature permits greater cutting speeds for a gear cutting operation without requiring a substantial increase in the actual cutting stroke speed, such as would go beyond cutting efficiency limits of known cutting tools. The non-circular gears which are used in the drive mechanism may be elliptical in shape, although a preferred non-circular configuration has been developed which provides substantially improved performance of the gear cutting apparatus. The formula for such gears is closely related to the crank mechanism which is incorporated in the gear cutting device, and relationships have been developed which provide the improved results and functions of this invention.

Figure 2:
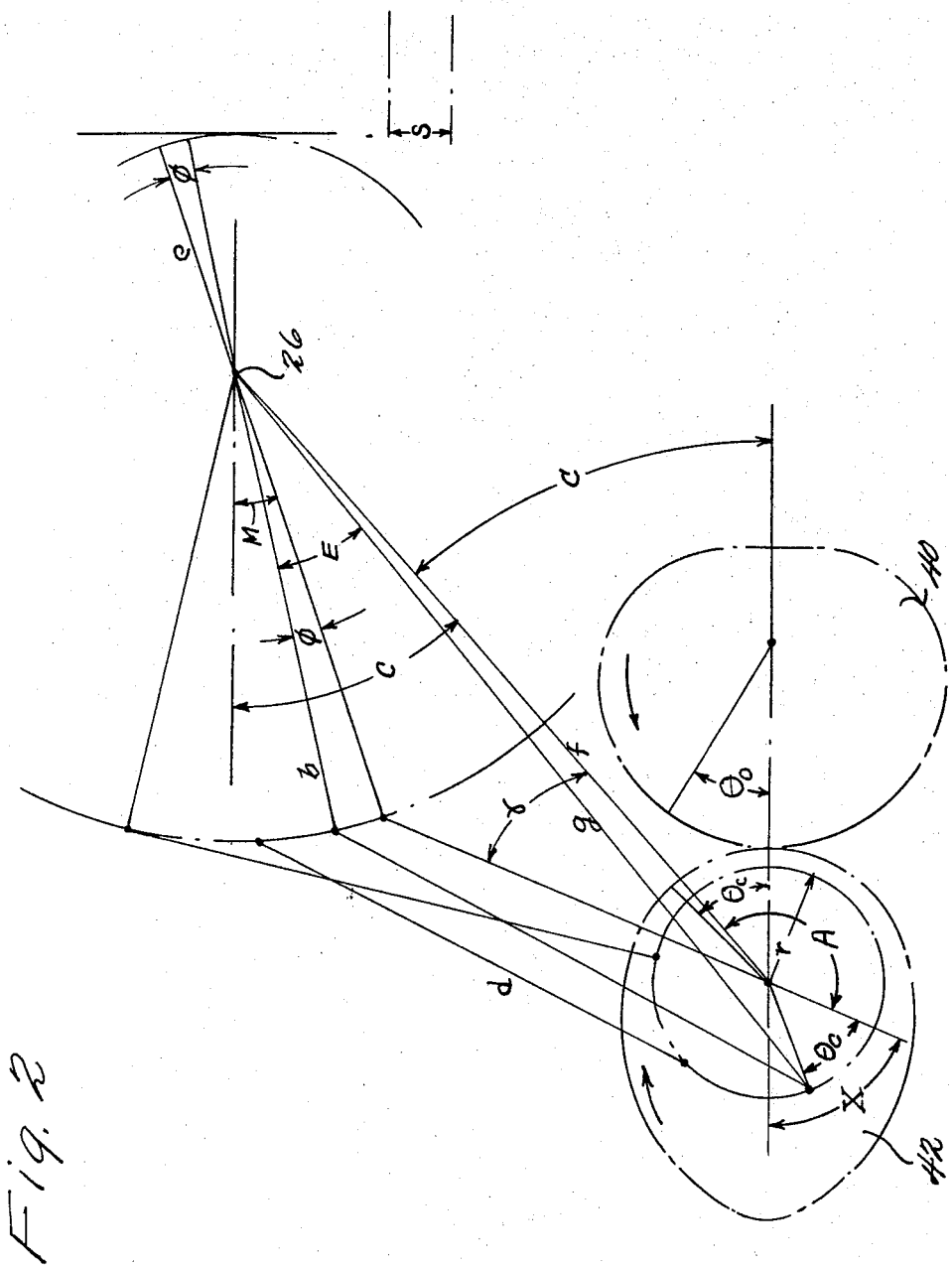
Figure 3:
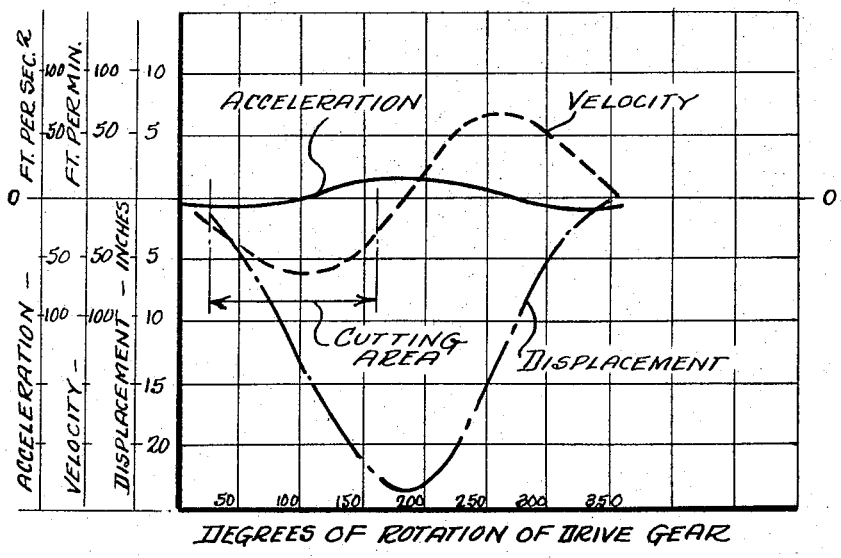
Figure 4:
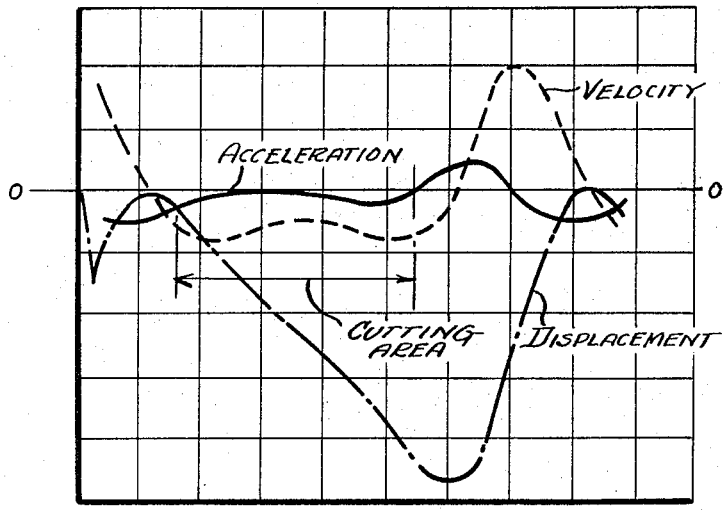

These and other advantages of this invention will become apparent in the more detailed discussion which follows, and in that discussion reference will be made to the following figures, in which:

FIGURE 1 is a vertical section of a gear cutting machine showing only a portion of the device which includes a gear cutter and spindle together with a crank and novel driving gear means of this invention;

FIGURE 2 schematically illustrates the geometry of the novel driving gears as related to the crank mechanism which reciprocates a gear cutter and spindle;

FIGURE 3 is a graph depicting acceleration, velocity and displacement curves of a gear cutting tool driven by a prior art type of mechanism; and FIGURE 4 is a graph depicting similar acceleration, velocity and displacement curves for a cutting tool as driven by the novel driving mechanism of this invention.

Referring to FIGURE 1, a portion of a gear shaping device is illustrated, and the illustrated portion corresponds closely to the FIGURE 4 illustration in Miller Patent 2,034,765. For convenience of discussion, and for emphasis of the novel features of this invention, as compared to the prior art, all of the subject matter of the Miller patent is intended to be included as a part of this description.

Generally, the gear shaper device includes a vertical spindle 10 which can be reciprocated on its vertical longitudinal axis. This spindle 10 carries a conventional cutting or shaping tool 12 at its lower end for engagement with a workpiece 14 which is mounted on a separate spindle means. It can be seen that the spindle 10 carries the gear cutting tool up and down in a reciprocating path, and the length of the path of reciprocation is indicated as S. The downstroke of the cutter includes the cutting stroke wherein the cutting tool engages and cuts material from the workpiece 14. The upstroke of the spindle and cutter will be referred to as the return stroke, and this movement places the cutter 12 in a return position for beginning a new cutting stroke.

In addition to being reciprocated, the spindle 10 may be rotated by a worm gear 16 which drives a gear 18 carried in driving engagement with the upper portion of the spindle 10. The upper portion of the spindle 10 is drivingly connected to the gear 18 through a guide 20, as is described in the Miller Patent 2,034,765. Further, the spindle 10 includes a spring 22 at its upper end for assisting the return movement of the spindle to its uppermost position. The spring 22 is compressed during a downward stroke of the spindle, and the compressive forces urge the spindle upwardly upon completion of the downstroke. These features are well known in the prior art and do not form a separate part of the present invention.

With prior drive mechanisms for reciprocating the cutter, the downstroke speed and the upstroke speed have been approximately equal to one another, and an increase of speed in one direction resulted in an increase in speed for the opposite direction of reciprocation. However, the downward cutting stroke speed of such gear shaping devices is limited by the efficiency of cutting action which can be accomplished with a given cutting tool and with the particular material which is being cut. Accordingly, attempts to increase the speed of prior operations have been necessarily limited to the maximum attainable speed for the cutting stroke of the apparatus. The present invention provides for increasing the speed of a gear cutting operation by maintaining the downstroke of a cutter at its most efficient speed, while substantially increasing the return stroke speed of the cutter to begin a new cutting cycle. Thus, there is no loss of cutting efficiency during a cutting reciprocation of the spindle and cutter, and considerable time is saved by rapidly moving the spindle and cutter to a return position. Additionally, the cutter is moved at a more uniorm cutting speed, with less change in cutting speed when the cutting tool is actually engaged with the workpiece.

The driving mechanism for reciprocating the spindle 10 and its cutter 12 includes a cranking system having an arm 24 which is rocked about a pivot point 26 by the motion of a connecting arm 28. The arm 24 includes a segment gear 30 for engaging and moving the spindle 10. Gear teeth on 30 engage rack teeth on the spindle 10 in a well known manner. The connecting arm 28 is eccentrically attached to a driven gear so as to impart a rocking motion to the arm 24. The pivotal mounting 26 and the means for mounting the connecting arm 28 to a driven gear are well known in the art and do not form a separate part of this invention. The connecting arm 28 can be adjusted by known adjusting devices to change its length $d$. Such adjusting means include means for locking the arm at the requisite adjusted length.

The invention provides for non-circular gears which effect the reciprocations of the spindle 10 in an improved pattern of movement. These gears are shown in FIGURES 1 and 2, and the gear 40 is a driving gear which engages the driven gear 42. The driving gear 40 is suitably connected to a motor means for rotating the gear in a counterclockwise direction and preferably at a constant r.p.m. Considering the principal axis of each gear to be the line through the center of the gear which contains both the minimum and the maximum radius for the gear, it can be seen that when the gears mesh along a principal axis with the maximum radius of the driving gear 40 contacting the minimum radius of the gear 42, the cutter spindle is in the center of an upstroke or return stroke. The gears are rotated in the direction shown by the arrows, and continued rotation from the position shown in FIGURE 2 results in the spindle being moved to its uppermost position for beginning a new cutting stroke. Because of the relationship of the gears when meshed on the principal axis, the maximum increase in speed for the spindle is applied during the completion of the upstroke, and conversely the maximum decrease in speed will be applied to the spindle at the center of its downward cutting stroke.

The desired configuration for the gears 40 and 42 and the effect of the gears on the spindle speed, acceleration and displacement can be determined from a study of the angles and measurements making up the driving mechanism for the spindle. A preferred formula for the relationship of the gears 40 and 42 is:

$$\theta_c = \theta_0 + K \cos \theta_0 + X$$

In this formula $\theta_0$ is an arbitrary angle of rotation for the driving gear 40, and $\theta_c$ is the corresponding angle of rotation for the driven gear 42. Zero position for $\theta_0$ occurs when the cutter spindle is at the top of a stroke, and of course, the gears are not in mesh along a common principal axis at that time. K is a constant equal to $$\frac{m-1}{m+1}$$

where $m$ is the overall change in ratio between the driven gear 40 and the driven gear 42, and K can be used to determine the amount of change required to adjust the basic system. X is an angle equal to $\gamma + C$, where $$\cos \gamma = \frac{f^2 + (d-r)^2 - b^2}{2f(d-r)}$$

and the angle X determines the phase relationship between the location of the arm 28 and the mesh of the gears 40 and 42.

From the above formula for the non-circular gears 40 and 42, the velocity, acceleration and length of strokes for the cutter spindle can be determined by the following additional formulas:

$S = e\phi$, where $e$ is the pitch radius of the segment 30 and $\phi$ represents the angle of rotation for the segment 30. The pitch radius $e$ may be expressed as equal to the number of teeth in a complete gear divided by the diametral pitch. The following formulas are used to determine $\phi$:

(1) $g = \sqrt{r^2 + f^2 - 2rf \cos(\theta_c + A)}$ ($g$ is the line connecting pivot P with the gear 42 radius $r$)

(2) $\sin H = \dfrac{r \sin(\theta_c + A)}{g}$ ($H$ is the angle between lines $g$ and $f$)

(3) $\cos E = \dfrac{b^2 + g^2 - d^2}{2bg}$ ($E$ is the angle between lines $b$ and $g$)

(4) $\phi = E + H + M - C$

In the above formulas $r$ is the radius of the driven gear 42. Further, the angles A, C and M and the length $b$, $d$, $e$ and $f$ are parameters of the system, and represent the angles and lengths shown. These parameters will vary with the size of gear being cut, and they will vary with different dimensions for the gear cutting machine. As already indicated, adjustments may be provided for adjusting a single machine to change these parameters. An example of such an adjustment is the provision for changing the length of $d$ of the arm 28. From the above formulas it is possible to obtain the velocity $dS/dt$ and the acceleration $$\left(\frac{d^2S}{dt^2}\right)$$

of the cutter spindle. Since the drive gear 40 turns at a constant r.p.m., the functions $dS/dt$ and $d^2s/dt^2$ are identical with $ds/d\theta_0$ and $d^2s_2/d\theta_0$. By substituting $\theta_0 + K \cos \theta_0 + X$ in place of $\theta_0$ in Formulas 1 and 2 the displacement velocity and acceleration of the cutter spindle can be calculated.

Referring to the graphs shown in FIGURES 3 and 4, the calculated functions for a cutter spindle are shown for prior art type circular driving gears (FIGURE 3) as compared to the non-circular gears of this invention (FIGURE 4). The two graphs of FIGURES 3 and 4 represent identical progressions on their vertical and horizontal axes, and the improved pattern of movement can be readily seen by comparing the two graphs. In the figures, the solid line which is graphed represents the acceleration of a spindle in feet per second [2] for the indicated degrees of rotation of the drive gear. The line which is shown by short dashes represents velocity in feet per minute for the same spindle, and the long dashed line shows displacement of the spindle in inches. The curves which are plotted on FIGURE 4 are for a pair of gears having the above indicated preferred form where X is equal to 80 degrees, M is equal to 4 and K equals .6. With these functions, it can be seen that the cutter spindle moves at a more uniform velocity during actual cutting engagement with a workpiece, and this engagement is indicated at the "cutting area" for the stroke. Such a uniformity in the velocity results in improved cutting characteristics. Furthermore, it can be seen that the spindle is more quickly returned to its uppermost position with the improved driving arrangement of FIGURE 4. The quick return feature substantially increases the rate of cutting gears, and the more uniform velocity of cut results in an increased number of gears produced per sharpening of the cutting tool because this number is dependent upon the maximum cutting speed which is attained during the cutting stroke.

Although the above formula for the non-circular gears has been indicated as a preferred configuration, it has also been found that other non-circular gears, such as elliptical gears, have satisfactory characteristics. The factor X has also been adjusted between 70 degrees and 100 degrees, but the most satisfactory results are obtained when X equals 80 to 85 degrees. When X is in this range there is the least change in velocity in the cutting spindle during the cutting portion of the cycle. Other changes and modifications will become apparent to those skilled in the art and such changes are intended to be included within the scope of this invention.

What is claimed is:

1. In a gear shaping machine having a vertical spindle for carrying a cutting tool, said spindle being mounted for vertical reciprocations and for engaging the cutting tool with a workpiece during the downward reciprocation of the spindle, and a driving mechanism for reciprocating of the spindle, said driving mechanism including gears for driving a cranking mechanism which in turn reciprocates said spindle in a pattern of movement determined by the configuration of said gears, the improvement comprising:

a pair of non-circular gears for driving said cranking mechanism, said pair of gears including a drive gear and a driven gear which intermesh on a principal axis for the pair when said spindle is at an approximate midpoint for an upward return stroke reciprocation, and wherein said cranking mechanism receives driving movements from said pair of gears so as to dictate a pattern of movement for said spindle which provides for a rapid return of said spindle to its uppermost position and for a more uniform velocity for said spindle during its downward cutting stroke, said pattern of movement being the result of the drive gear rotating in a direction which rotates the driven gear at a maximum increase in speed during the upward movement of the spindle from its midpoint position to its uppermost position and at a maximum decrease of speed at the midpoint of a downstroke for said spindle.

2. The improvement of claim 1 wherein said non-circular gears have the formula:

$\theta_c = \theta_o + K \cos \theta_o + X$ wherein $\theta_c$ is an arbitrary angle of rotation for said driven gear, $\theta_o$ is the corresponding angle of rotation for said drive gear, K is a constant equal to $m-1/m+1$ where $m$ represents the overall change in ratio between the drive and driven gears, and where X represents the phase relationship between the location of the cranking mechanism and the mesh of said non-circular gears, X being in the range of 70°–100°.

3. The improvement of claim 2 wherein $K=.6$ and $X=80°$.

4. The improvement of claim 2 wherein said cranking mechanism includes a first arm for reciprocating the spindle, said first arm being connected at one end to said spindle and at its opposite end to a second arm, said first arm further being pivotally mounted to rock about a pivot between its ends; and wherein said second arm is eccentrically connected to said driven gear at one end and to said first arm at an opposite end.

5. The improvement of claim 1 wherein said non-circular gears are elliptical in configuration and wherein said elliptical gears mesh on a principal axis with the maximum radius of said drive gear contacting the minimum radius of said driven gear when the spindle is at the midpoint of an upstroke.

References Cited
UNITED STATES PATENTS

| | | | |
|---|---|---|---|
| 2,129,858 | 9/1938 | Miller | 90—7 |
| 2,596,343 | 5/1952 | Miller | 90—7 |
| 3,225,658 | 12/1965 | Levanovich | 90—7 |

GERALD A. DOST, *Primary Examiner.*